(12) United States Patent
Denton

(10) Patent No.: US 6,971,722 B2
(45) Date of Patent: Dec. 6, 2005

(54) LOW COST TRUCK OR LIKE HUBCAPS

(75) Inventor: Dennis N. Denton, Gastonia, NC (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 10/808,828

(22) Filed: Mar. 25, 2004

(65) Prior Publication Data

US 2005/0212347 A1  Sep. 29, 2005

(51) Int. Cl.[7] .......................... B60B 27/00; B60B 7/14
(52) U.S. Cl. ............................ 301/108.4; 301/37.372
(58) Field of Search .................. 301/108.1–108.4, 301/37.371, 37.372, 37.376

(56) References Cited

U.S. PATENT DOCUMENTS

| | | | |
|---|---|---|---|
| 3,114,579 A * | 12/1963 | Isenbarger | 301/108.2 |
| 3,177,041 A * | 4/1965 | Isenbarger | 301/108.2 |
| 4,073,540 A * | 2/1978 | Jackowski | 301/108.3 |
| 4,240,670 A * | 12/1980 | Zorn et al. | 301/35.622 |
| 4,606,582 A | 8/1986 | Warren | |
| 4,787,681 A | 11/1988 | Wang et al. | |
| 5,150,949 A | 9/1992 | Wang | |
| 5,190,355 A * | 3/1993 | Hobbie et al. | 301/105.1 |
| 5,505,525 A | 4/1996 | Denton | |
| 5,542,750 A | 8/1996 | FitzGerald | |
| 5,664,846 A * | 9/1997 | Kuck | 301/108.1 |
| 5,752,746 A * | 5/1998 | Perry | 301/108.1 |
| 5,860,708 A * | 1/1999 | Borders et al. | 301/108.1 |
| 2002/0080023 A1 * | 6/2002 | DeMarco et al. | 340/463 |

* cited by examiner

*Primary Examiner*—Russell D. Stormer
*Assistant Examiner*—Jason R. Bellinger
(74) *Attorney, Agent, or Firm*—Vedder Price Kaufman & Kammholz

(57) ABSTRACT

The hub cap has first end wall portion, a sidewall portion and a laterally extending mounting flange. There are plural fastener-receiving openings in the flange. A second endwall portion is integrally formed on the flange and is free from engagement with the hold-down ring. The second end wall portion has a plurality of integral retainers of reduced diameter with respect to the remainder of the wall. There is a hold down ring made from a stiff metal material, overlying the flange on the hub cap. The hold down ring has plural fastener-receiving openings therein, and the retainers snugly secure the hold-down ring in its installed position.

11 Claims, 3 Drawing Sheets

US 6,971,722 B2

LOW COST TRUCK OR LIKE HUBCAPS

BACKGROUND OF THE INVENTION

The present invention relates generally to hubcaps for trucks or other large vehicles, and more particularly, to hubcaps having a number of novel features.

The present invention is applicable, not only to plastic hubcaps which do not contain any openings, but also to hubcaps which include one or more openings for adding lubricant or checking lubricant within the sealed cavities, opening for pressure venting, etc.

In the past, hubcaps have proven successful which have used an embedded, die-cast ring, preferably of die-cast aluminum, as a part of the flange by which the hub cap is secured.

Such hubcaps, for example, include a flange with plural holes, but also the flange contains an insert of a relatively complex configuration which is preferably made by die casting. Such an insert contains increased height portions surrounding the bolt holes, spaced apart by a portion of less height between them. Consequently, the portion defining a bolt-through opening must be inserted into the cavity, following which the cavity is filled with plastic and then removed as a unit from the mold. This construction is used whether or not the hubcap body itself contains one or more vents.

The disadvantage of the above described method is that the ring requires considerable time in the molding cycle to cool off before becoming integral with the hubcap flange. Moreover, the insert must be placed in a final position and clamped down. The cylindrical openings for the bolts are placed in position, and thereafter, the hubcap is molded around the insert. This requires time, and although not overly difficult to accomplish, still adds considerable cost to what otherwise would be a simple, moldable part.

Accordingly, it is an object of the invention to provide an improved plastic hubcap.

Another object of the invention is to provide a hubcap which lacks the complexity of previous hubcaps, particularly those containing a die-cast stiffener which requires considerable time in the molding cycle.

Another object of the invention is to provide a hubcap having a simple, stamped and galvanized steel portion which may be used to hold the flange in position.

A further object of the invention is to provide a galvanized steel ring which may be held in position by a series of properly arranged tabs or retainers.

A still further object of the invention is to provide a clamping ring or the like which may be provided at the lowest possible cost.

Another object of the invention is to provide a simple flanged hubcap containing a plurality of retainers, preferably having molded retainers on an outside portion of the hubcap flange.

A further object of the invention is to provide a series of hubcap flange retainers which will make it difficult for the retainer ring to shift position once it is installed, with the bolt-receiving openings being placed in registry with the openings on the hubcap flange during assembly.

These and other objects of the present invention are achieved by in practice providing a hubcap having a hubcap body including sidewall and end wall portions, with or without openings in the side walls or end walls, a flange portion, a series of integral small retainers preferably formed on the outside of the flange, and a ring, preferably of stamped and galvanized steel, placed over the flange and secured to the hubcap by plural fasteners, thereby evenly distributing the hold down load.

The manner in which these and other objects of the invention are carried into practice will become more clearly apparent when reference is made to the following detailed description of the preferred embodiments of the invention and shown in the accompanying drawings in which like reference numbers indicate corresponding parts throughout.

DESCRIPTION OF THE PREFERRED EMBODIMENTS OF THE INVENTION

Whereas the invention may be practiced in other ways, and other variations will occur to those skilled in the art, a description will now be given of several preferred embodiments of the invention.

Figure 1:
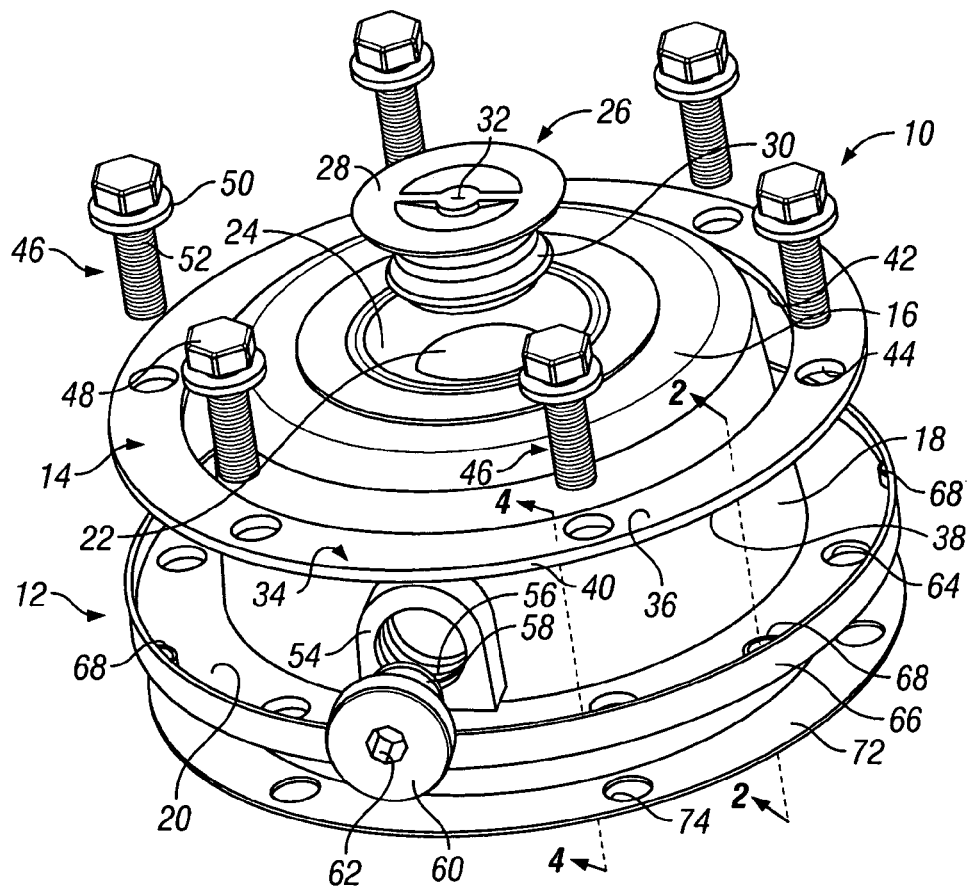
FIG. 1 is an exploded perspective view of a portion of one form of hubcap made according to the present invention.

Referring now to the drawings in greater detail, FIG. 1 shows a hubcap assembly generally designated 10. The hubcap assembly 10 is shown to include a hubcap itself generally designated 12, and a hold down ring generally designated 14. The hubcap 12 includes a circular axially facing end wall portion 16, a sidewall portion 18, and a mounting flange 20. The axially facing end wall 16 shown has an opening 22, within a tapered inner portion 24, forming a part of the end wall 16. A removable plug generally designated 26 is shown to include an end face portion 28 and a contoured side wall portion 30, as well as a vent portion 32 in the end portion 28 of the plug 26.

Figure 5:
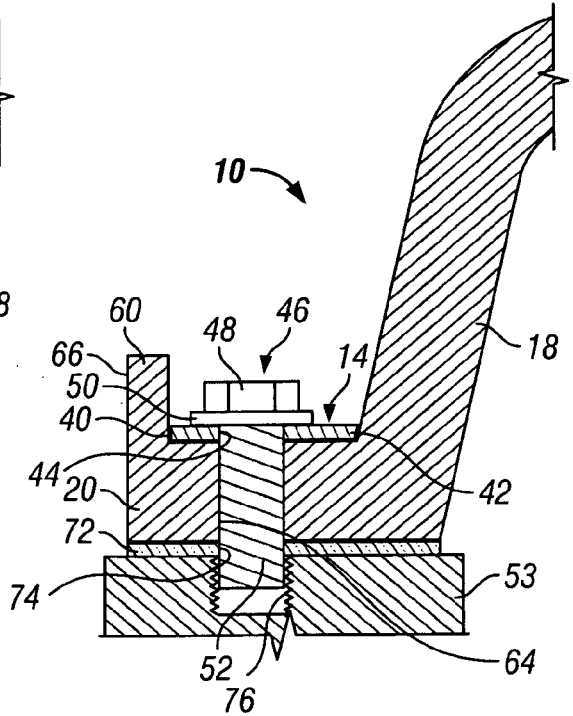
FIG. 5 is a figure similar to FIGS. 2–4 but showing the fastener, a portion of the hub and other elements of the invention in still another position.

The contoured side wall 30 of the plug 26 fits snugly within the space defined by the tapered portion 24 of the axially facing end wall 16 and the opening 22. The hold down ring generally designated 14 includes a main body portion generally designated 34 of annular configuration having a pair of flat oppositely directed faces 36, 38, and radially outer and inner edge portions 40, 42. A plurality of openings 44 are spaced evenly about the periphery of the hold down ring generally designated 14. A plurality of fasteners generally designated 46 each typically includes a head portion 48, a captive washer or flange portion 50, and a threaded shank 52 for mating with a portion of the hub 53 (FIG. 5).

Referring again to the hubcap 12 itself, in this embodiment it also includes an opening defined by a circular sidewall 54, having a threaded inside surface 56 for receiving the threaded shank portion of 58 of a plug 60 having a hexagonal opening 62 in the head thereof for receiving an Allen wrench (not shown) or the like.

The flange portion 20 of the hubcap 12 is shown to include a plurality of circular openings 64, and a raised radially outer end wall 66. The radially outer end wall 66 contains a number, preferably, four to six, of contoured retainers 68. These retainers 68 are of a small size and are preferably formed integrally with the flange 20 and the raised radially outer end wall 66.

Figure 2:
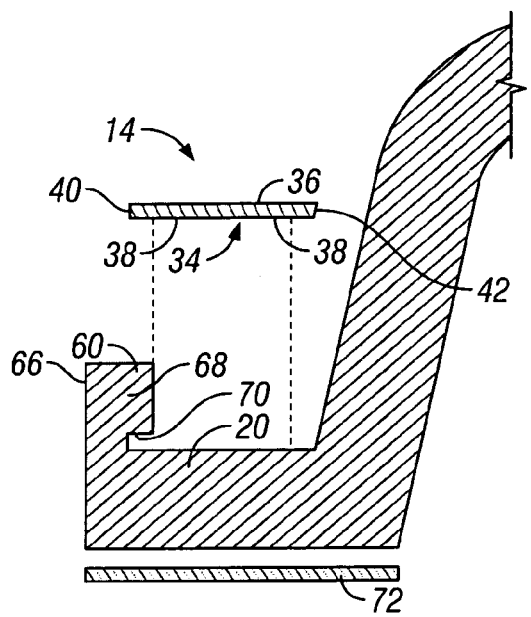
FIG. 2 is an enlarged, somewhat schematic, exploded, partial sectional view taken along lines 2—2 of FIG. 1 and showing the hub cap sidewalls, the gasket, the flange and the retainer in relation to the hold down ring.
Figure 3:
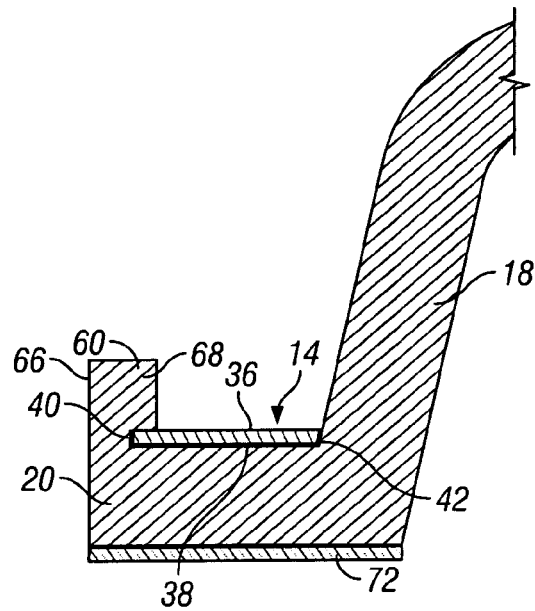
FIG. 3 shows the components of FIG. 2 in an assembled relation.

Referring now to FIGS. 1–3, there are shown small spaced apart retainers 68 defining there beneath thin grooves 70 of a thickness equal to or just smaller than the thickness of the hold-down ring 14.

It will also be seen that FIG. 2 shows portions of the hold down ring generally designated 14, including its outer and inner surfaces 40, 42, about to be fitted into the flange 20. This figure also shows the radially outer end wall portion 66 and the enlarged width retainer 68 therein. The figures may show the proportions of these parts somewhat exaggerated, since in practice the retainer 68 is deflected slightly merely by pushing outwardly on the radially outer end wall 66, thereby opening the groove 70 enough to accommodate the ring 14.

The gasket 72 is also shown whereby the flange 20 and the ring 14 holds the gasket in position and places the entire assembly 10 in compression. As shown, the shank 52 of the fastener 46 extends through the openings 44, 64 and 74 defined by the ring 36, the flange 20 and the gasket 72, enters the tapped opening 76 in the hub 53 and thereby secures these elements together.

Figure 4:
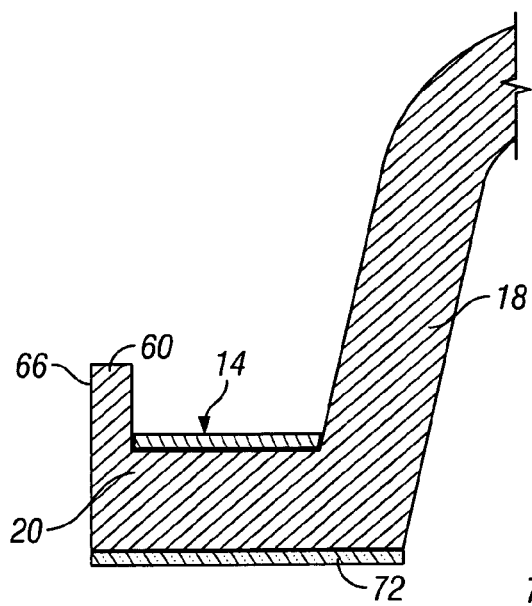
FIG. 4 shows a portion of the flange in another position, and taken along lines 3—3 of FIG. 1.

FIG. 2 shows that the recess 70 may be opened slightly by deflecting the radially outer end wall 66 and the retainer 68, and that the ring 14 is then emplaced and the assembly completed by inserting the fasteners as just described. FIG. 5 shows the unit 10 as finally assembled, with the fastener shanks 52 extending into the threaded openings 76. FIG. 4 shows the ring generally designated 14 in a position wherein the retainers are absent and the radially outer endwall 66 is of reduced thickness, which is the usual case.

Figure 7:
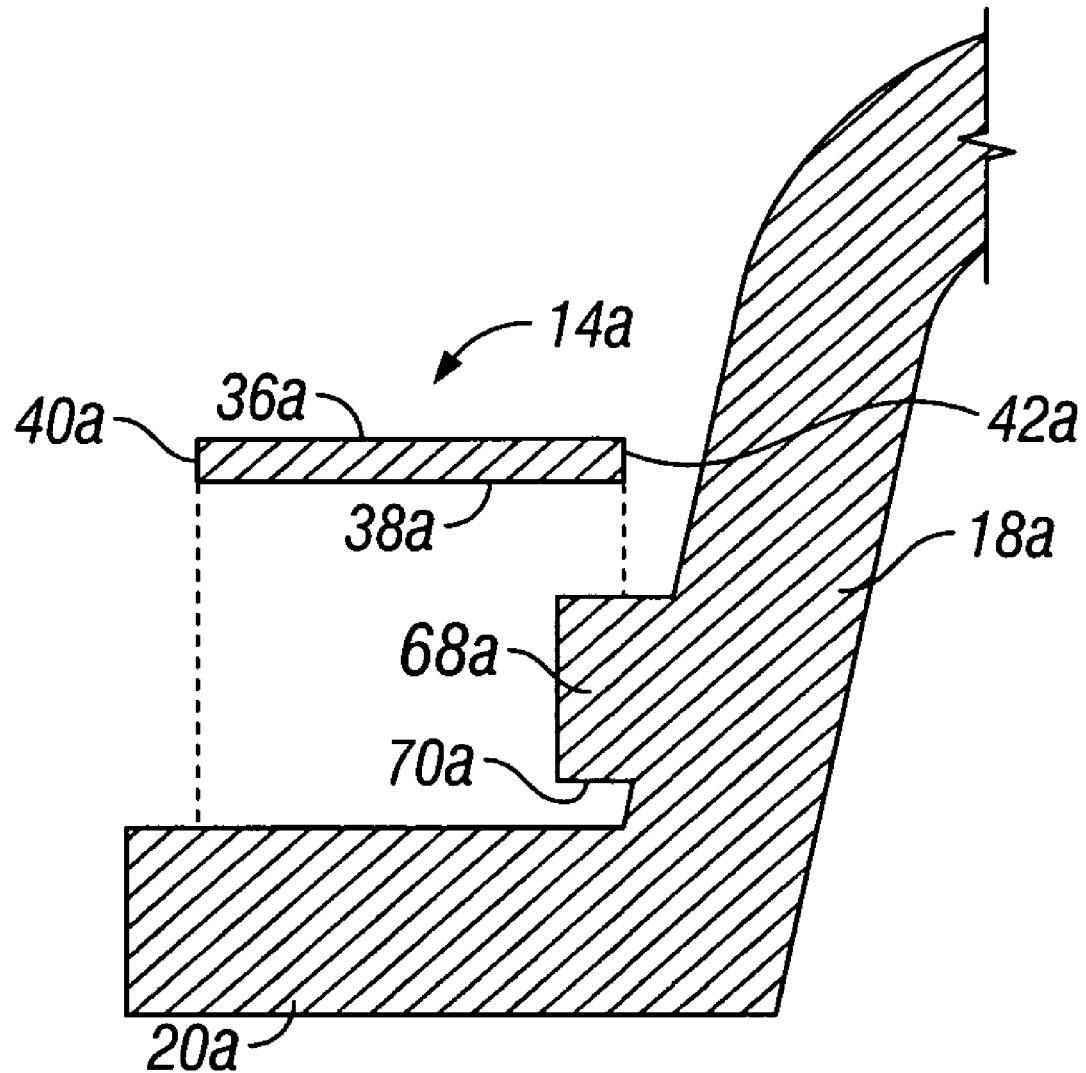
FIG. 7 is a greatly enlarged form of the integral retainer and the hold down ring of the embodiment of FIG. 6.

It is also possible that the retainers could be formed on the inside portion of the sidewall 18. However, such a construction is less advantageous than having the retainers on an end wall outside the bolt circle, since it is usually desired to deflect these retainers while installing the ring. Such a construction, however, is shown in FIG. 7. This drawing shows a hub cap with retainers 68a integrally formed in the sidewall 18a, and spaced apart from the flange 20a by a distance 70a substantially equal to the thickness of the hold down ring 14a. The drawings, of course, are not to scale. The hold down ring 14a has the same surfaces 36a, 38a, 40a and 42a as its counterpart 20.

The advantages of a plastic hubcap are several. However, with the additional advantage of lower cost and less molding time being required, the present invention has several advantages. A faster molding cycle is presented, since the cross-section of the various parts is relatively constant, i.e., the flange and the sidewalls are of uniform thickness and are ordinarily the same thickness as one another. In the past, where the flange was formed and required an insert molding operation, then not only was the insert required to be positioned accurately, but there were a number of components of varying thicknesses, presenting problems achieving the correct molding time.

Figure 6:
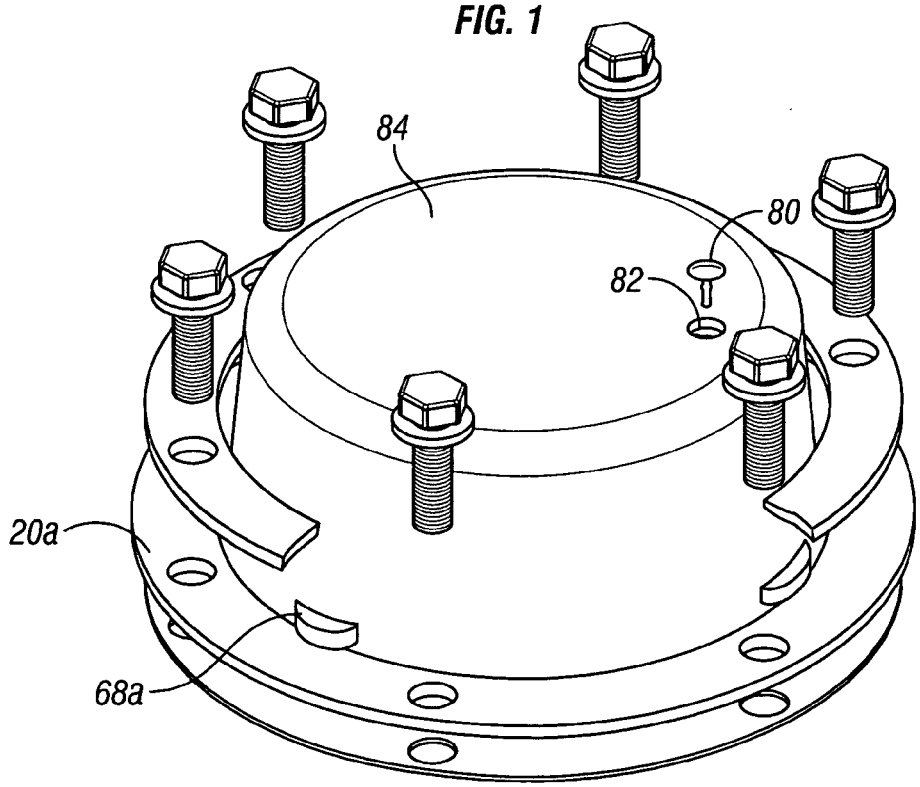
FIG. 6 is a view with portions broken away, showing one additional form of the hubcap side wall incorporating a different form of retainer which may be used with the present invention.

FIG. 6 also shows that there are other forms of hubcap which may use the same galvanized steel ring as a hold down. In the case of FIG. 6, there is shown a removable vent plug 80 which is positioned in the opening 82 and, in this construction, there is no threaded plug 58 or its counterpart 54. Except for those elements, and, of course, the location of the retainers 68a, the construction is essentially the same. The vent plug 80 permits air to escape from the sealed cavity, and, in the event of pressure build up, and may optionally relieve that pressure when a certain threshold of vacuum is achieved within the sealed cavity. The vent 80 may be located centrally of the top surface 84 of the hubcap, or may be on the periphery thereof, as shown.

The preferred material for the hold down ring is a thin piece of steel which is merely stamped and then galvanized. This provides a rustproof finish and also provides the lowest possible cost, particularly when compared to the integrally formed die cast ring which was present in the prior art. The stiffness of the ring 14 will, of course, depend on its thickness, but those skilled in the art are able to determine the maximum thickness, which should ordinarily be from 0.040 to 0.125 inches, in most cases, and also depending on the diameter of the hub to be sealed and the force intended to be placed thereon.

It will thus be seen that the present invention provides an improved hubcap having a number of advantages and characteristics, including those heretofore pointed out and others which are inherent in the invention.

I claim:

1. A hub cap assembly comprising, in combination, a hub cap and a hold-down ring, said hub cap having a first axially facing end wall portion, a sidewall portion integrally formed with said axially facing end wall portion, and a radially extending flange integrally formed with said sidewall portions for mounting said hub cap on an associated hub structure, a plurality of fastener-receiving openings in said flange, and a radially outer end wall portion integrally formed on said flange and being free from engagement with said hold-down ring, said radially outer end wall portion extending perpendicular to said flange and said radially outer end wall having a plurality of integrally formed retainers of reduced diameter with respect to the remainder of said radially outer end wall portion, said retainers overlapping the outer margin of said hold-down ring and being spaced axially from said flange by a given distance, said hold down ring being made from a stiff material, overlying said flange and having a thickness substantially equal to said given distance, said hold down ring having plural fastener-receiving openings therein, said retainers thereby snugly securing said hold-down ring in position with said hold-down ring openings being in registry with said flange openings.

2. A hub cap assembly as defined in claim 1 wherein said first axially facing end wall portion contains a removable plug.

3. A hub cap assembly as defined in claim 2 wherein said plug contains a vent for relieving excess internal pressure.

4. A hub cap assembly as defined in claim 1 wherein said sidewall contains a removable plug so that lubricant may be periodically added to the structure sealed by said hub cap.

5. A hub cap assembly as defined in claim 1 wherein said hold down ring is made from a steel material and is galvanized.

6. A hub cap assembly as defined in claim 4 wherein said plug is a threaded plug.

7. A hub cap assembly as defined in claim 1 wherein said hub cap is imperforate.

8. A hub cap assembly as defined in claim 1 wherein said axially facing end wall portion contains a small vent plug.

9. A hub cap assembly as defined in claim 1 wherein said hub cap is made from a thermoplastic material.

10. A hub cap assembly comprising, in combination, a hub cap and a hold-down ring, said hub cap having a first axially facing end wall portion, a sidewall portion integrally formed with said axially facing end wall portion, and a laterally extending flange integrally formed with said sidewall portion for mounting said hub cap on an associated hub structure, a plurality of fastener-receiving openings in said flange, and a plurality of retainers integrally formed on said sidewall portion, said retainers being of increased diameter with respect to the remainder of said sidewall portion, said retainers overlapping the inner margin of said hold-down ring and being spaced axially from said flange by a given distance, said hold down ring being made from a stiff material, overlying said flange and having a thickness substantially equal to said given distance, said hold down ring having plural fastener-receiving openings therein, said retainers thereby snugly securing said hold-down ring in position with said hold down ring openings in registry with said flange openings.

11. A hub cap assembly as defined in claim 10 wherein said hold down ring is made from a galvanized steel material.

\* \* \* \* \*